US011808245B2

United States Patent
Vaichere et al.

(10) Patent No.: US 11,808,245 B2
(45) Date of Patent: Nov. 7, 2023

(54) HYDROTURBINE MANUFACTURE (71) Applicant: GE Renewable Technologies, Grenoble (FR)

(72) Inventors: Antoine Vaichere, Saint Egreve (FR); Erwan Gwenaël Pein, Grenoble (FR); Sylvain Gaudion, Grenoble (FR)

(73) Assignee: GE Renewable Technologies, Grenoble (FR)

( * ) Notice: Subject to any disclaimer, the term of this patent is extended or adjusted under 35 U.S.C. 154(b) by 0 days.

(21) Appl. No.: 16/964,488

(22) PCT Filed: Jan. 25, 2019

(86) PCT No.: PCT/EP2019/051836
§ 371 (c)(1),
(2) Date: Jul. 23, 2020

(87) PCT Pub. No.: WO2019/145468
PCT Pub. Date: Aug. 1, 2019

(65) Prior Publication Data
US 2021/0033060 A1  Feb. 4, 2021

(30) Foreign Application Priority Data
Jan. 25, 2018 (EP) ..................... 18305055

(51) Int. Cl.
*F03B 3/02* (2006.01)
*F03B 3/12* (2006.01)

(52) U.S. Cl.
CPC ............... *F03B 3/02* (2013.01); *F03B 3/121* (2013.01); *F05B 2230/21* (2013.01); *F05B 2260/02* (2013.01)

(58) Field of Classification Search
CPC .... F03B 3/02; F03B 3/12; F03B 3/121; F03B 3/125; F05B 2230/21; F05B 2260/02;
(Continued)

(56) References Cited

U.S. PATENT DOCUMENTS 2,784,936 A * 3/1957 Schmidt .............. F04D 29/2222
416/186 R
3,797,965 A * 3/1974 Tonooka ................. F03B 3/125
416/186 R
(Continued)

FOREIGN PATENT DOCUMENTS

CN   204 003 234 U   12/2014
CN   105209208 A   12/2015
(Continued)

OTHER PUBLICATIONS

JP2002310053A_Translation (Fukuda, N.) Oct. 23, 2002. Received from: STIC (Year: 2002).*
(Continued)

*Primary Examiner* — Woody A Lee, Jr.
*Assistant Examiner* — Elton K Wong
(74) *Attorney, Agent, or Firm* — Dority & Manning, P.A.

(57) ABSTRACT

A runner for a hydraulic machine comprising a band, a crown, a plurality of blades extending between the crown and the band, wherein the runner comprises a plurality of runner segments which together define the runner, each runner segment comprising a band portion, a crown portion and a blade, which portions are integrally formed with one another, each runner segment being attachable to another segment at a band joining edge and a crown joining edge, wherein the band joining edge and the crown joining edge are each spaced apart from the blade of the segment.

7 Claims, 6 Drawing Sheets

(58) Field of Classification Search
CPC ............. Y10T 29/49332; B23P 15/006; B23K 2101/001; B23K 1/0018; B23K 9/095–0956; B23K 9/12–126
USPC ........................................................ 29/889.6
See application file for complete search history.

(56) References Cited

U.S. PATENT DOCUMENTS

| | | | |
|---|---|---|---|
| 4,213,025 A * | 7/1980 | Kuhnen | B23K 9/0213 219/124.33 |
| 2007/0134098 A1* | 6/2007 | Huber | F03B 3/125 416/191 |
| 2011/0206518 A1* | 8/2011 | Bouvet | F03B 3/125 416/185 |
| 2012/0308397 A1 | 12/2012 | Sabourin et al. | |
| 2015/0076120 A1* | 3/2015 | Pagano | B23K 9/0213 219/124.1 |
| 2015/0192101 A1* | 7/2015 | Rossi | F03B 3/125 416/186 R |

FOREIGN PATENT DOCUMENTS

| | | |
|---|---|---|
| DE | 10 2012 202 602 A1 | 8/2013 |
| DE | 10 2012 214 246 A1 | 2/2014 |
| FR | 2 049 789 A5 | 3/1971 |
| JP | S53 8445 U | 1/1978 |
| JP | S53 70241 A | 6/1978 |
| JP | S55 123374 A | 9/1980 |
| JP | 2002 310053 A | 10/2002 |
| SE | 505 375 C2 | 8/1997 |

OTHER PUBLICATIONS

Chandankar, B. Productivity Improvement in Welding Robot. International Journal of Current Engineering and Technology [online], Oct. 2016 [retrieved on Jul. 6, 2022]. Retrieved from the Internet: <URL: https://www.researchgate.net/publication/317427924_Productivity_Improvement_in_Welding_Robot > (Year: 2016).*
EPO Search Report, dated Jul. 10, 2018.
PCT Search Report, dated Apr. 2, 2019.
Chinese Office Action with translation, dated Sep. 30, 2021.
EPO Notice of Opposition, dated Jun. 30, 2023.

* cited by examiner

HYDROTURBINE MANUFACTURE

This invention relates to a runner for a turbine or other machine, and particularly, but not exclusively to a runner for a hydraulic machine such turbine, pump or pump turbine used, for example in a hydroelectric power station. The invention also relates to a method of assembling such a runner, and to a hydraulic machine incorporating such a runner.

The invention relates particularly to a Francis-type runner for a hydraulic machine intended to have a forced flow of water passed through it. In a turbine such as a Francis turbine, such a flow has the effect of rotating the runner. When the machine is a pump, such a flow results from this rotation.

It is known in the art that a hydraulic machine of the type described above comprises Francis-type runners that each comprise a band, a crown and blades extending between the band and the crown.

Such a runner may be made of one piece which may be formed as a cast, or may be welded. However, hydraulic machines of the type described herein may have large dimensions, particularly if the machine is for use in a hydroelectric power station. As such, the runners can be expensive and take a lengthy period of time to manufacture. Furthermore, elements of large runners, for example the crown and band are difficult to transport. In addition, the manufacture and construction of such a runner requires skills that are becoming increasingly difficult to find in the existing workforce. Further, the manufacture of such a runner may present health and safety issues due to the need to enter confined sections of hydraulic passages of the runner in order to perform welding and grinding operations, for example.

In known hydraulic machines of this type, it is known to split the turbine runner into two or more segments in order to permit the runner to be transported from the manufacturing site to the location at which it is to be used. In such known hydraulic machines, the runner segments are assembled by making welding joints at the crown, the band and the split blades.

According to a first aspect of the present invention there is provided a runner for a hydraulic machine comprising one or more of a band; a crown; a plurality of blades preferably extending between the crown and the band, wherein the runner preferably comprises a plurality of runner segments which may together define the runner, each runner segment preferably comprising a band portion, a crown portion and a blade. Preferably, the portions and the blade may be integrally formed with one another. Each runner segment may be attachable to another segment at a band joining edge and a crown joining edge, wherein the band joining edge and the crown joining edge may be each spaced apart from the blade of the segment.

The hydraulic machine may comprise any machine such as a turbine, pump or pump-turbine. In embodiments of the invention, the hydraulic machine comprises a Francis turbine or Francis pump. The hydraulic machine may be adapted for use in a hydroelectric power station.

According to another aspect of the invention there is provided a Francis-type turbine comprising a runner as described herein.

Because a runner according to the present invention is formed from a plurality of runner segments, some of the disadvantages highlighted above are overcome.

In addition, each runner segment may comprise a band portion, a crown portion and a blade. Preferably, each segment may comprise a single blade. The portions of a runner segment may be integrally formed. A runner segment may be formed by any convenient means and may for example be casted.

In each segment, the band may have at least one band joining edge and the crown portion may have at least one crown joining edge. Each of the joining edges may be spaced apart from the blade of the segment. In other words, the blade may extend from a portion of the band portion that may be spaced apart from the band joining edge, and may extend to a portion of the crown portion that may be spaced apart from the crown joining edge.

In each segment, the band may have a first band joining edge and a second band joining edge. The crown portion may have a first crown joining edge and a second crown joining edge. The blade may extend from a portion of the band portion which is positioned between the first band joining edge and a second band joining edge. The blade may extend from a portion of the band portion which is equidistant between the first band joining edge and a second band joining edge. The blade may extend to a portion of the crown portion between the first crown joining edge and the second crown joining edge. The blade may extend from a portion of the band portion which is equidistant between the first crown joining edge and a second crown joining edge.

The band joining edges and the crown joining edges are located so that the corresponding welds are at the point of least stress in use. The areas of greatest stress on the runner in use is where the blade meets the band and crown.

Preferably, the band joining edges and/or the crown joining edges may be defined by the intersection of a cylinder with the band and/or the crown.

This means that when two segments are joined together when forming the runner, it will not be necessary to form any joints near to the blade. This overcomes a problem in existing prior art runners formed from runner segments where joints are formed at the most stressed areas, such as at a junction between the blade and either the crown or band portions.

By means of the present invention therefore it is not necessary to weld the blade to a crown portion or a band portion when forming a runner, nor is it necessary to form joints near to the blade, due to the positioning of the blade away from joining edges of the runner segment.

In embodiments of the invention each runner segment is substantially the same size and shape as each other runner segment.

This means that all segments may be formed from the same casting mould, for example.

When the joints are formed from welds, it is possible for all welds to be performed from outside of the runner as the joint is accessible to a welding robot, thereby avoiding the accessibility issues health and safety issues for welders.

In embodiments of the invention each crown portion may have a first crown joining edge and a second crown joining edge, and each band may have a first band joining edge and a second band joining edge.

The first and second crown joining edges may be spaced apart from one another to define opposite edges of the crown portion. Similarly, the first and second band joining edges of the band portion may be spaced apart from one another to define edges of the band portion.

In embodiments of the invention, the blade may extend from an area of the crown portion that may be spaced apart from and between the first and second crown joining edges, and may extend to an area of the band portion that may be spaced apart from and between the first and second band joining edges.

This position of the blade ensures that the blade is positioned away from the joining edges of the runner segment. This in turn ensures that it is not necessary to form welds and other joints anywhere near the most stressed areas of the runner segment, such as between a blade and a crown or band portion.

In embodiments of the invention the band joining edges and/or the crown joining edges may be curved. The curved shape of the joining edges enables the joining process to be carried out more efficiently, as will be described in more detail hereinbelow.

The joining edges may have any particular curve. In preferred embodiments of the invention the joining edges preferably define an arc of a circle or an arc of an ellipse. In other embodiments of the invention, the joining edges may define an elliptical curve, for example.

According to a second aspect of the present invention there is provided a method of assembling a runner. The method may comprise one or more of the steps of forming a runner segment preferably comprising a band portion, a crown portion and a blade as an integral component, such that the band portion may comprise a first band joining edge and a second joining edge, the crown portion may comprise a first joining edge and a second joining edge, which edges may be spaced apart from the blade; and joining a plurality of runner segments together at the joining edges to form the runner.

In embodiments of the invention, the runner segments may be joined together by welding.

In some embodiments of the invention, the welding may be narrow gap welding, although other welding processes could also be used.

Narrow gap welding may be carried out on an external surface of each segment thus making the process more efficient and safer.

Through use of narrow gap welding techniques, the quality of the weld may be enhanced. In addition, the weld volume may be reduced. Further, when automatic narrow gap welding techniques are used all weld parameters may be recorded.

In some embodiments of the invention the welding is carried out automatically using an automatic welding tool such as a robotic welding tool. In such embodiments, the welding tool may follow a curved trajectory during the welding process.

In embodiments of the invention, the trajectory may define a cylindrical surface. Alternatively, or in combination, the trajectory may be defined by the intersection of a cylindrical surface which may be circular or elliptical with the band and the crown.

By having a trajectory that follows a predetermined path, the welding process is simplified, and automatic welding is possible.

In embodiments of the invention, the curve of the trajectory followed by the welding tool may have any convenient radius, and in some embodiments of the invention the radius of a surface of a cylinder defining the trajectory followed by the welding tool may be infinite. In such circumstances, the trajectory will be a straight line.

By means of the present invention, a runner for a hydraulic machine is formed from a plurality of runner segments that are substantially identical to one another. Each runner segment will have first and second crown joining edges and first and second band joining edges.

All of the joining edges are shaped to define an arc of a circle or other curved shape. It is therefore possible to make use of narrow gap welding using a robotic welding tool which may be programmed to follow a trajectory which follows the curve of the joining edges. In this way, a weld may be formed along adjacent joining edges in order to join adjacent runner segments to form the runner.

According to a third aspect of the invention there is provided a hydraulic machine comprising a runner according to the first aspect of the invention.

The invention will now be further described by way of example only with reference to the accompanying drawings in which.

Figure 1:
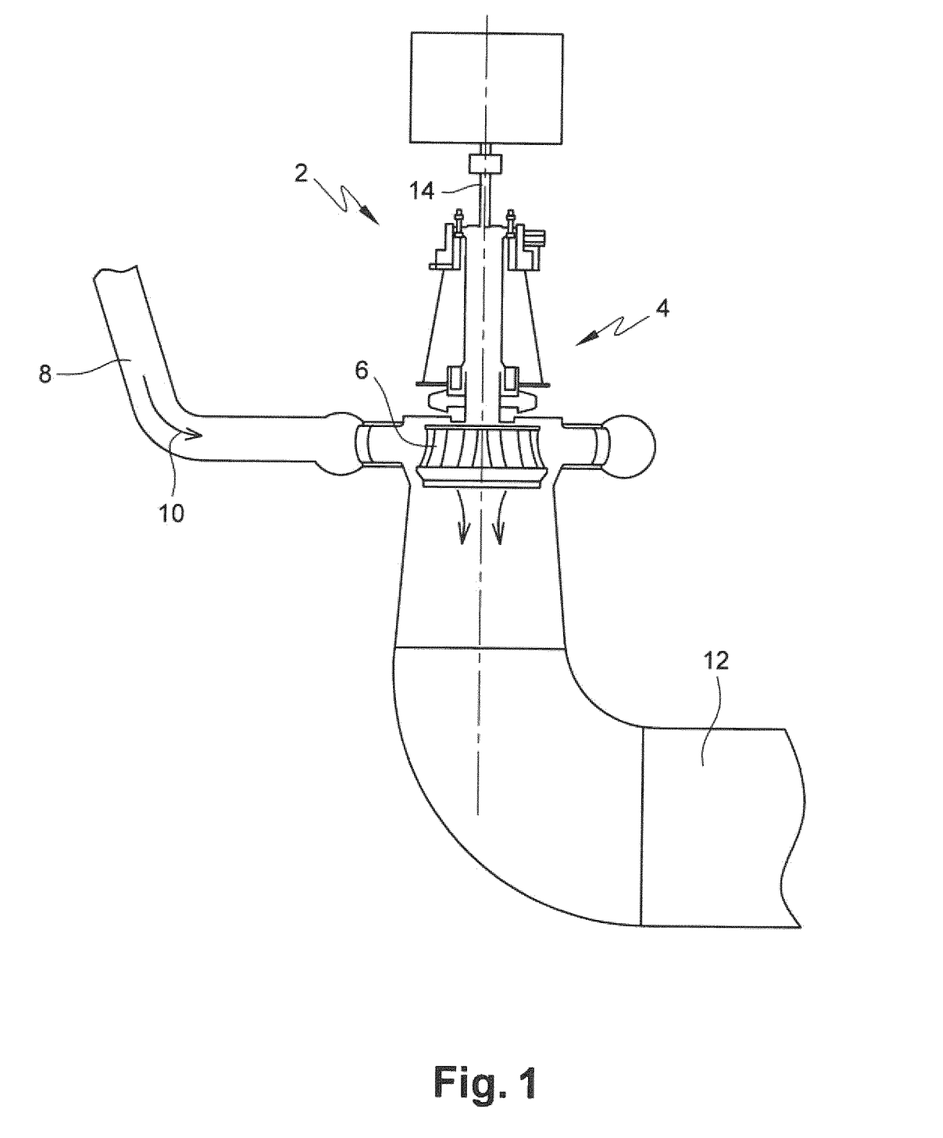
FIG. 1 is a longitudinal cross-section of a turbine with a Francis runner, including a rotatable turbine shaft coupled to the runner.

Referring first to FIG. 1, a hydraulic machine according to embodiments of aspects of the invention is designated generally by the reference numeral 2. In the illustrated embodiment, the hydraulic machine 2 comprises a Francis turbine 4. The Francis turbine 4 in turn comprises a Francis runner 6, according to embodiments of the invention. During operation of the Francis turbine 4, water will enter the turbine via conduit 8 and will flow through the Francis runner 6, as indicated by arrows 10 in a known manner. The water will then exit via conduit 12. As is well-known in the art, the flow of water through the Francis runner 6 will cause rotation of the Francis runner which, in turn, will cause rotation of the shaft 14.

In other embodiments of the invention, the hydraulic machine could be a pump or pump-turbine, for example. When the hydraulic machine 2 comprises a pump, rotation of the pump runner will cause flow of water in a known manner.

Embodiments of the invention, will now be described in more detail with reference to FIGS. 2 to 9.

Figure 2:
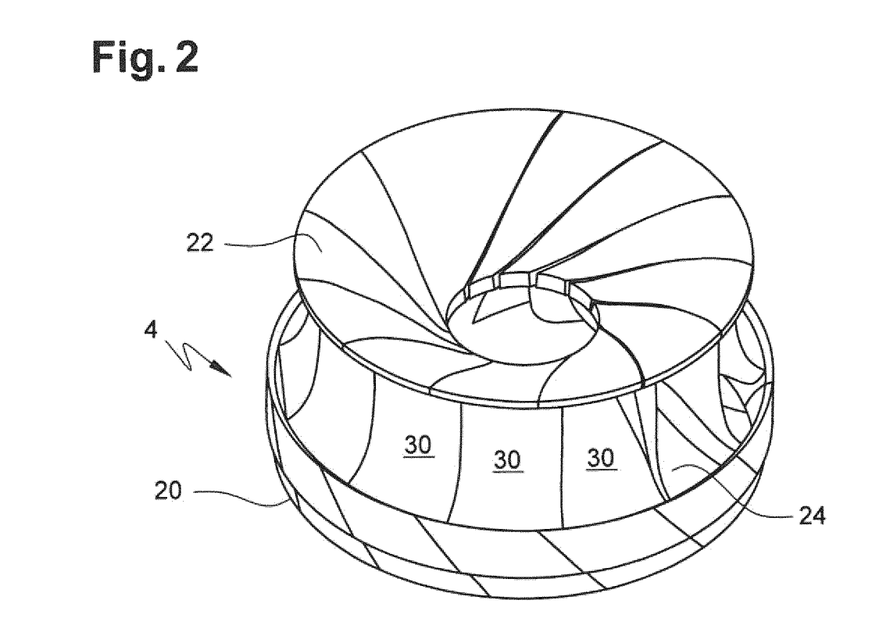
FIG. 2 is a schematic perspective view of a Francis runner according to an embodiment of the invention.
Figure 3:
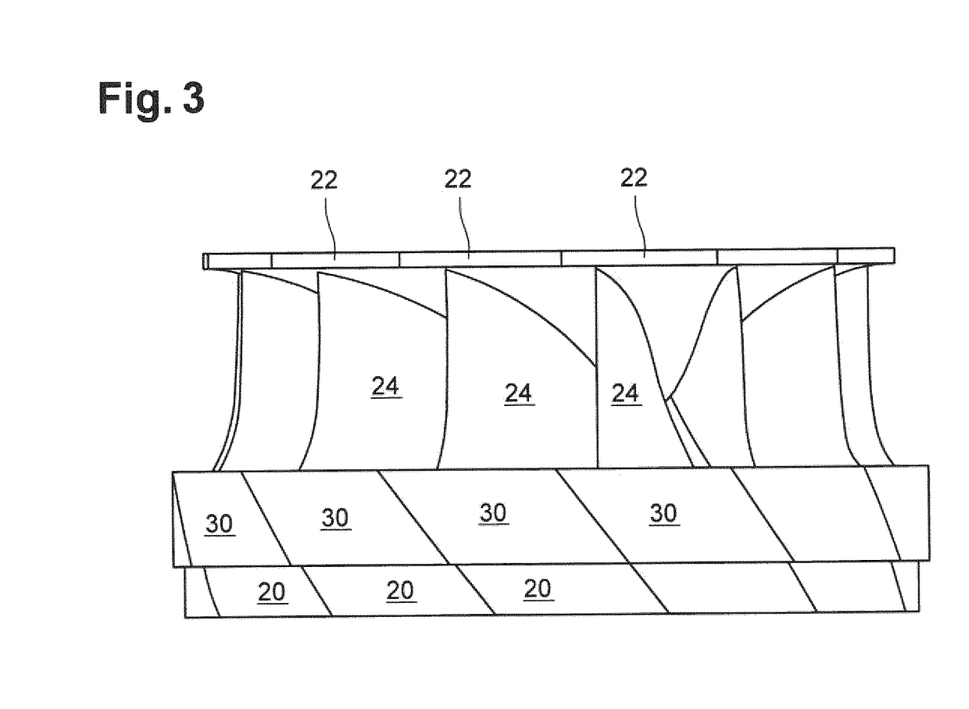
FIG. 3 is a side view of the Francis runner of FIG. 2.

As shown in FIGS. 2 and 3, the Francis runner 6 comprises a band 20, a crown 22 and a plurality of blades 24. Each of the plurality of blades 24 extends from the crown 22 to the band 20.

Figure 5:
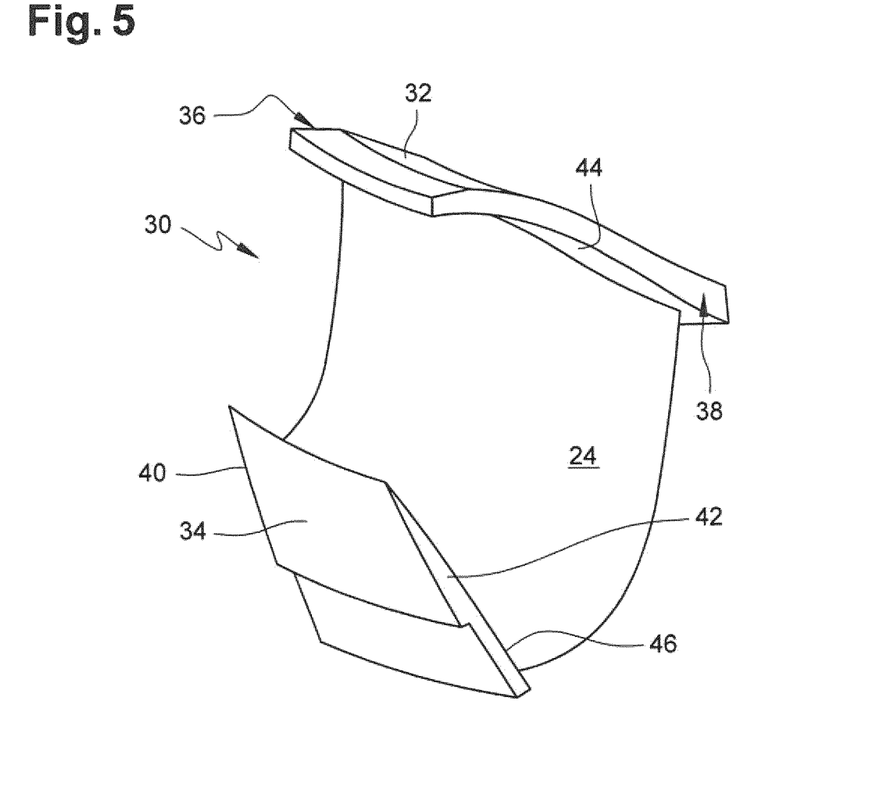
FIG. 5 is a schematic representation of a runner segment forming part of the Francis runner of FIG. 2.

The Francis runner 6, according to embodiments of the invention, comprises a plurality of runner segments 30, as shown in more detail in FIG. 5.

Each runner segment 30 comprises a crown portion 32 and a band portion 34. Each runner segment 30 comprises a blade 24 which extends between the crown portion 32 and the band portion 34.

The crown portion comprises a first crown joining edge 36 and a second crown joining edge 38. Similarly, the band comprises a first band joining edge 40 and a second band joining edge 42.

The blade 24 extends between the crown portion 32 and the band portion 34 from an area of the crown portion that is spaced apart from both the first crown joining edge 36 and the second crown joining edge 38 to an area of the band portion that is spaced apart from both the first band joining edge 40 and the second band joining edge 42.

Such a configuration ensures that when the runner segments 30 are joined together by, for example, a welding process, the welds formed are well away from the high stress regions which are typically where the blade 24 meets the crown 22 and the band 20, respectively.

In this embodiment of the invention, each runner segment 30 will be integrally formed by, for example, a casting process. In addition, each runner segment 30 used to form a complete Francis runner 6 will be substantially identically shaped to each other segment.

Figure 8:
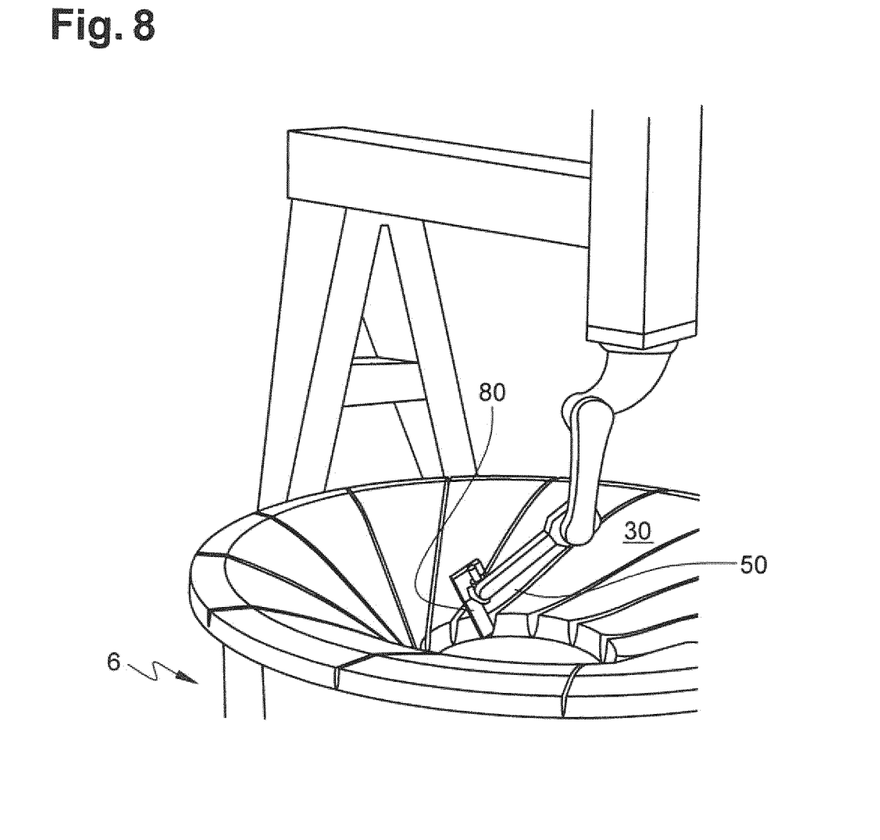
FIG. 8 is a partial perspective view of the Francis runner of FIG. 2 showing a robotic welding tool joining adjacent runner segments.

When it is required to assemble the Francis runner 6, the individual runner segments are brought together and welds are formed to join adjacent segments to one another to form the complete Francis runner 6, as shown in FIG. 8. This process will be described in more detail herein below.

Figure 4:
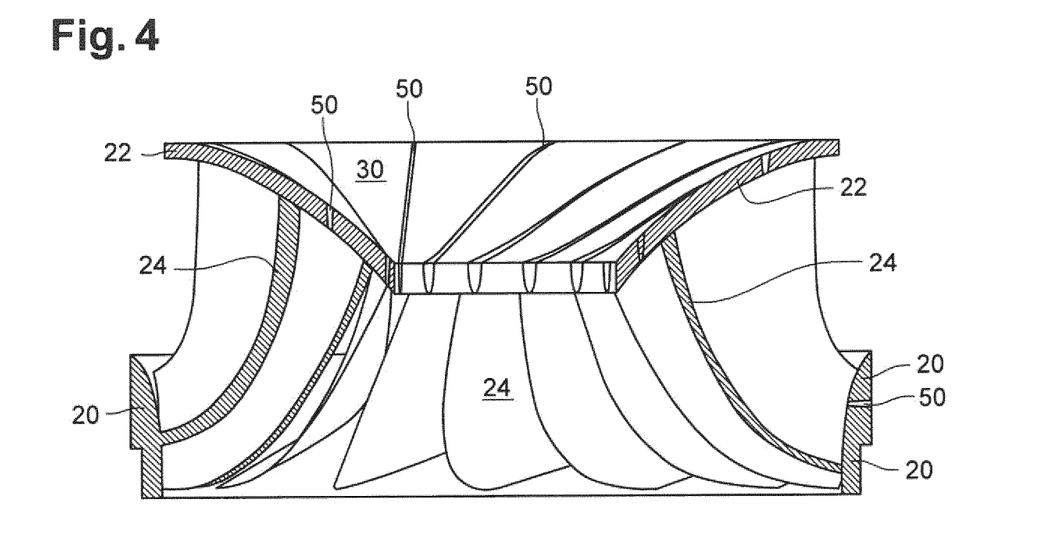
FIG. 4 is a schematic cross-sectional representation of the Francis runner of FIG. 2 showing how individual runner segments are welded together.

Turning now to FIG. 4, the positioning of welds used to join adjacent segments 30 is shown schematically. As can be seen, a plurality of welds 50 have been formed in order to join adjacent runner segments 30 together to form the complete Francis turbine 6. It can be seen from FIG. 4 that the welds are located at a position which is away from the blades 24. This ensures that the welds are not formed in areas of high stress. This, in turn, means that the joins between adjacent segments will be stronger than may be the case in similar prior art Francis turbines.

The weld may be formed by any convenient process, but, in this embodiment of the invention, the welds have been formed using an automated narrow-gap welding process.

In order to ensure that the process is efficient, both the crown joining edges and the band joining edges have been designed so that they are curved. This can be seen particularly in FIG. 6a which shows the shape of the join between two segments of a runner. A portion of a pump turbine band is shown in in solid outline.

Figure 6A:
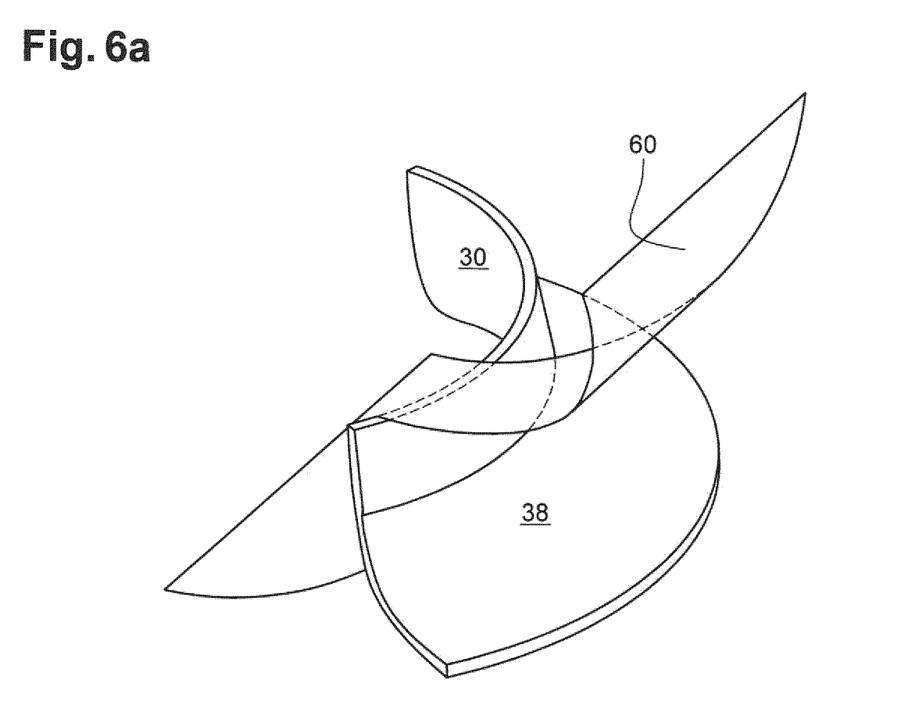
FIG. 6a is a schematic representation of the junction between two segments of a pump runner of a pumped storage plant (PSP), illustrating the curved trajectory followed by a welding tool to join the segments together.

Because the joining edges are curved, in an automated narrow-gap welding process, a welding tool may be programmed to follow a curved trajectory in order to create the welds 50. The trajectory is shown extending from the intersection of a cylinder and the band. This trajectory must be followed by a welding tool to join the segments together.

In this embodiment of the invention, the trajectory followed by the welding tool will substantially track the surface of the cylinder, as shown by the dotted lines 60 in FIG. 6a. Such a trajectory enables an efficient automated welding process to be carried out, since there are no complicated moves that have to be carried out by the welding tool.

The radius of the cylinder, the surface of which is tracked by the trajectory of the welding tool, may be any convenient radius, and, in some embodiments of the invention, the radius must be infinite. In such embodiments of the invention, the trajectory of the welding tool will be substantially a straight line.

Figure 6B:
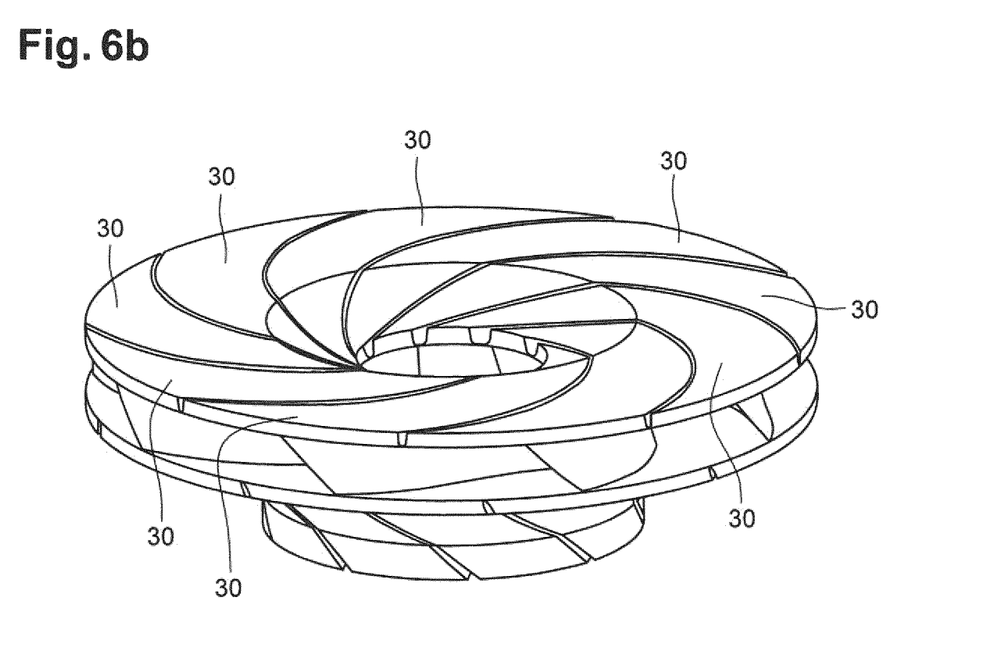
FIG. 6b is a schematic representation of a runner of a pumped storage plant (PSP) produced in accordance with the invention.

FIG. 6b shows an assembled pump turbine runner which has been produced using a method according to the invention.

Figure 7:
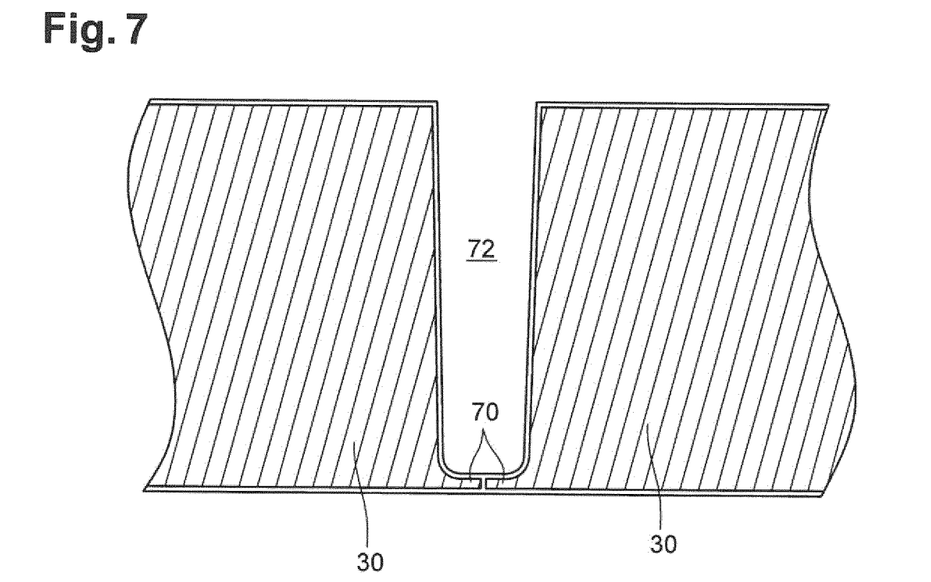
FIG. 7 is a detailed representation of a portion of adjacent runner segments showing the gap between adjacent segments formed when the segments abut one another.

Turning now to FIG. 7, a detailed partial view of two adjacent runner segments 30 is shown. As can be seen from FIG. 7, each segment is shaped to have an extension 70 forming part of a joining edge. This means that when adjacent runner segments are positioned next to each other ready to be joined, a small gap 72 is created. The weld is positioned within this gap 72 during the welding process.

The narrow-gap angle chamfer may be 1° or 5° on each side of the gap. The size of the space between the two faces of the chamfer of the gap is dependent on the size of the welding torch. GTAW narrow gap torches may be used with the present invention. Accordingly, the chamfer root may have a diameter of around 13 mm for example. GMAW narrow gap torches typically require a chamfer root with a larger diameter, for example, around 18 mm. Accordingly, the small gap 72 may have a diameter of between approximately 13 mm and 18 mm. Other embodiments of the invention may utilise other sizes of gap, as necessary.

Turning now to FIG. 8, a robotic tool 80 is shown creating the welds 50 between adjacent runner segments 30.

Figure 9:
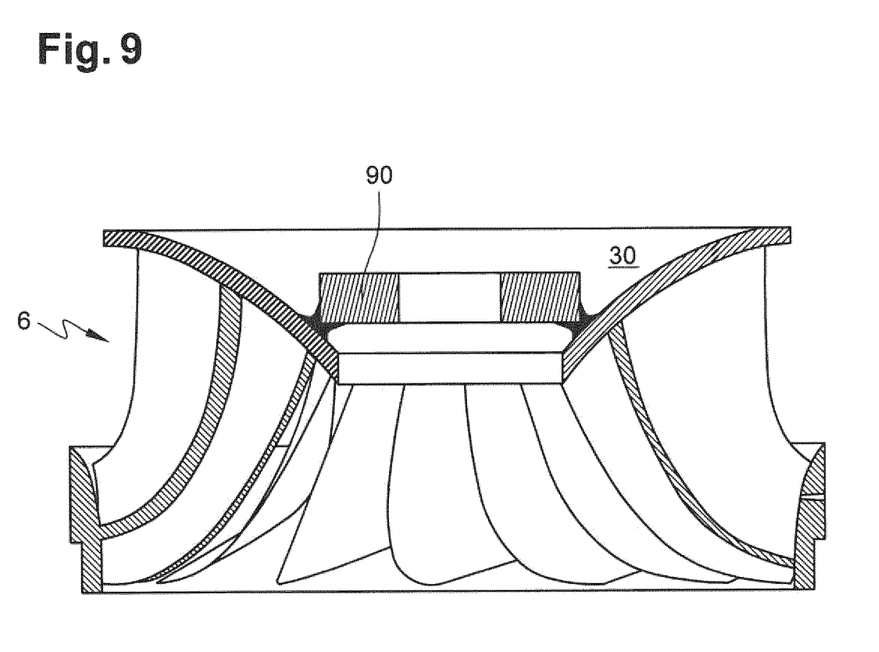
FIG. 9 is a cross-sectional representation of the Francis runner of FIG. 2 after being welded together and including a coupling flange welded to the top of the runner.

Turning now to FIG. 9, a completed Francis runner 6 is shown in which the adjacent runner segments 30 have been welded together. In addition, a coupling joint or flange 90 has been welded to the crown 22 of the Francis runner 6 in order to enable the runner 4 to be connected to shaft 14, shown in FIG. 1.

The aforementioned embodiments are not intended to be limiting with respect to the scope of the appended claims, which follow. Furthermore, features of one or more of the above embodiments may be readily combined with one or more features of another embodiment. It is also clear to the skilled person that various substitutions, alterations, and modifications may be made to the invention without departing from the scope of the invention as defined by the claims.

The invention claimed is:

1. A runner for a hydraulic machine, comprising:
   a band;
   a crown;
   a plurality of blades extending between the crown and the band,
   a plurality of runner segments, wherein each runner segment comprises a band portion, a crown portion, and a blade of the plurality of blades;
   wherein the band portion, the crown portion, and the blade of each runner segment are integrally formed with one another;
   each runner segment attachable to another runner segment at a band joining edge and a crown joining edge;
   wherein the band joining edge and the crown joining edge are each spaced apart along a length thereof from the blade of the respective runner segment;
   each of the runner segments comprising an integral extension at the band joining edge and the crown joining edge;
   the extensions meeting and defining a closed-end of a gap between the band or crown joining edges of adjacent runner segments, the gaps comprising an open-end facing outward from the runner and chamfered sides that angle towards the closed-end of the gap, the gap comprising a width to accommodate a narrow gap torch for subsequent welding together of the adjacent runner segments with a weld joint within the gap; and
   wherein both of the band joining edges and the crown joining edges are continuously curved along a complete length thereof, wherein the continuous curve corresponds to an intersection of a constant radius cylinder with the band or the crown.

2. The runner as in claim 1, wherein each crown portion has a first crown joining edge and a second crown joining edge, and each band portion has a first band joining edge and a second band joining edge.

3. The runner as in claim 2, wherein in each runner segment the blade extends between the band portion and the crown portion from a part of the band portion remote from both the first and second band joining edges, to a part of the crown portion remote from the first and second crown joining edges.

4. A Francis turbine comprising the runner as in claim 1.

5. A hydraulic machine comprising a runner as in claim 1.

6. A method of assembling a runner, comprising the steps of:
   forming a runner segment comprising a band portion, a crown portion, and a blade as an integral component, such that the band portion comprises a curved first joining edge and a curved second joining edge, the crown portion comprises a curved first joining edge and a curved second joining edge, the crown portion and band portion first and second joining edges spaced apart along a length thereof from the blade of the segment;
   the curved joining edges formed with an integral extension, wherein the extensions meet and define a closed-end of a gap between the curved band and crown joining edges of adjacent runner segments, the gap having an open-end facing outward from the runner and chamfered sides that angle towards the closed-end of the gap;
   wherein the curved joining edges are continuously curved along a complete length thereof;
   joining a plurality of the runner segments together at the curved joining edges to form the runner, the joining process comprising:
      with a robotic welding tool operating from outside of the runner, forming a weld within the gaps between the adjacent runner segments with a narrow gap welding torch;
   wherein, for each respective curved joining edge of the crown portion and the band portion, the robotic welding tool follows a predetermined trajectory during the welding step that corresponds to a respective constant radius cylinder that intersects with the crown portion or the band portion.

7. The method as in claim 6, wherein the runner is a runner for a Francis turbine.

* * * * *